United States Patent [19]
Deviny

[11] Patent Number: 5,872,197
[45] Date of Patent: Feb. 16, 1999

[54] INITIATOR SYSTEM AND ADHESIVE COMPOSITION MADE THEREWITH

[75] Inventor: E. John Deviny, Roseville, Minn.

[73] Assignee: Minnesota Mining & Manufacturing Company, St. Paul, Minn.

[21] Appl. No.: 880,317

[22] Filed: Jun. 23, 1997

Related U.S. Application Data

[60] Continuation of Ser. No. 715,997, Sep. 19, 1996, abandoned, which is a division of Ser. No. 515,187, Aug. 11, 1995, abandoned.

[51] Int. Cl.$^6$ .............................. C08F 4/52; C09J 4/00; B05D 3/02
[52] U.S. Cl. ...................... 526/196; 156/332; 427/385.5
[58] Field of Search .......................... 526/196; 156/332; 427/385.5

[56] References Cited

U.S. PATENT DOCUMENTS

| | | | |
|---|---|---|---|
| 2,985,633 | 5/1961 | Welch et al. | 260/85.3 |
| 3,141,862 | 7/1964 | Kirshenbaum et al. | 260/45.5 |
| 3,275,611 | 9/1966 | Mottus et al. | 260/80.5 |
| 3,340,193 | 9/1967 | Fields et al. | 252/56 |
| 3,418,260 | 12/1968 | Trofimenko | 260/2 |
| 3,425,988 | 2/1969 | German et al. | 260/47 |
| 3,451,952 | 6/1969 | Slocombe | 260/2.5 |
| 3,476,727 | 11/1969 | Lo Monaco et al. | 260/92.8 |
| 3,527,737 | 9/1970 | Masuhara et al. | 260/78.5 |
| 3,829,973 | 8/1974 | Masuhara et al. | 32/15 |
| 4,167,616 | 9/1979 | Bollinger | 526/197 |
| 4,379,728 | 4/1983 | Lin | 156/331.3 |
| 4,485,229 | 11/1984 | Waddill et al. | 528/111 |
| 4,515,724 | 5/1985 | Ritter | 260/410 |
| 4,524,181 | 6/1985 | Adam et al. | 525/107 |
| 4,638,092 | 1/1987 | Ritter | 568/1 |
| 4,639,498 | 1/1987 | Ritter | 526/196 |
| 4,656,229 | 4/1987 | Chiao | 525/518 |
| 4,676,858 | 6/1987 | Ritter | 156/307.3 |
| 4,684,538 | 8/1987 | Klemarczyk | 427/54.1 |
| 4,721,751 | 1/1988 | Schappert et al. | 524/773 |
| 4,731,416 | 3/1988 | Saunders | 525/131 |
| 4,775,734 | 10/1988 | Goel | 528/89 |
| 4,874,814 | 10/1989 | Cartier et al. | 525/61 |
| 4,904,360 | 2/1990 | Wilson, Jr. et al. | 204/181.7 |
| 4,920,188 | 4/1990 | Sakashita et al. | 526/196 |
| 4,921,921 | 5/1990 | Ritter | 526/195 |
| 4,985,516 | 1/1991 | Sakashita et al. | 526/196 |
| 5,021,507 | 6/1991 | Stanley et al. | 525/127 |
| 5,106,928 | 4/1992 | Skoultchi et al. | 526/196 |
| 5,143,884 | 9/1992 | Skoultchi et al. | 502/160 |
| 5,286,821 | 2/1994 | Skoultchi | 526/196 |
| 5,310,835 | 5/1994 | Skoultchi et al. | 526/198 |
| 5,376,746 | 12/1994 | Skoultchi | 526/196 |
| 5,401,805 | 3/1995 | Chung et al. | 525/288 |
| 5,539,070 | 7/1996 | Zharov et al. | 526/198 |
| 5,616,796 | 4/1997 | Pocius et al. | 564/9 |
| 5,621,143 | 4/1997 | Pocius | 564/8 |

FOREIGN PATENT DOCUMENTS

| | | | |
|---|---|---|---|
| 0 649 582 | 10/1993 | Australia . | |
| 0 664 459 | 6/1963 | Canada . | |
| 2061021 | 10/1992 | Canada | C09D 157/00 |
| 0 051 796 A1 | 5/1982 | European Pat. Off. . | |
| 0 511 464 A1 | 11/1992 | European Pat. Off. . | |
| 42-14318 | 8/1967 | Japan . | |
| 45-29195 | 9/1970 | Japan . | |
| 46-16888 | 5/1971 | Japan | B01J 000/00 |
| 48-18928 | 6/1973 | Japan | C09J 5/00 |
| 53-102394 | 9/1978 | Japan | C08F 4/40 |
| 62-288675 | 12/1987 | Japan | C09J 3/14 |
| 3-177470 | 8/1991 | Japan . | |
| 3-264509 | 11/1991 | Japan | A61K 6/00 |
| 93-235089 | 9/1993 | Japan | A61K 6/00 |
| 904403 | 8/1962 | United Kingdom . | |
| 988632 | 4/1965 | United Kingdom . | |
| 1113722 | 5/1968 | United Kingdom | C08F 1/28 |
| 1132261 | 10/1968 | United Kingdom | C08F 1/84 |
| WO 95/22567 | 8/1995 | WIPO . | |

OTHER PUBLICATIONS

The Trialkylborane–initiated Graft Copolymerization of Methyl Methacrylate onto Hemoglobin, K. Kojima, S. Iwabuchi and K. Kojima *Bulletin of the Chemical Society of Japan*, vol. 44, pp. 1891–1895 (1971).

A New Method for the Graft Copolyermerization of Methyl Methacrylate onto Proteins and Fibers, *Polymer Letters*, vol. 9, pp. 25–29 (1971).

The Grafting of Methyl Methacrylate onto Cotton by Tri–n–butylborane, K. Kojima, S. Iwabuchi, K. Murakami, K. Kojima and F. Ichikawa, *Journal of Applied Polymer Science*, vol. 16, pp. 1139–1148 (1972).

Grafting of Vinyl Monomers by Tri–n–Butylborane onto Chlorophyll and Related Compounds, *Polymer Letters Edition*, vol. 13, pp. 361–363 (1975).

Tributylborane–Initiated Grafting of Methyl Methacrylate onto Chitin, K. Kojima, M. Yoshikuni and T. Suzuki, *Journal of Applied Polymer Science*, vol. 24, pp. 1587–1593 (1979).

Grafting of Methyl Methacrylate onto Silk Fibers Initiated by Tri–n–Butylborane, M. Tsukada, T. Yamamoto, N. Nakabayashi, H. Ishikawa and G. Freddi, *Journal of Applied Polymer Science*, vol. 43, pp. 2115–2121 (1991).

Molecular Weight Distribution of the Methyl Methacrylate (MMA) Polymer Separated from the MMA–Grafted Silk Fiber, M. Tsukada, Y. Goto, G. Freddi, T. Yamamoto and N. Nakabayashi, *Journal of Applied Polymer Science*, vol. 44, pp. 2197–2202 (1992).

(List continued on next page.)

*Primary Examiner*—Jeffrey T. Smith
*Assistant Examiner*—N. Sarofim
*Attorney, Agent, or Firm*—Steven E. Skolnick

[57] ABSTRACT

Systems for initiating the polymerization of acrylic monomers comprising (1) organoborane amine complexes and (2) bireactive decomplexers preferably comprising at least one free-radically polymerizable group and at least one amine-reactive group in the same molecule. The decomplexer is capable of forming a covalent bond with both the acrylic monomers and amine complex, resulting in a reduced level of mobile constituents. Furthermore, when the organoborane amine complex of the initiator system comprises a polyamine compound, polymerized acrylic compositions having improved solvent resistance are advantageously provided.

52 Claims, No Drawings

OTHER PUBLICATIONS

Synthesis of Functionalized Polypropylene and Polypropylene–Polymethylmethacrylate Graft Copolymer, D. Rhubright and T.C. Chung, Proceedings of the American Chemical Society, *Polymeric Materials Science and Engineering*, vol. 67, pp. 112–113 (1992).

Polymerization of Acrylonitrile in Presence of Tributylborine, G. Kolesnikov and L. Fedorova, translated from *Bull. Acad. Sci. USSR, Div. Chem. Sci.*, p. 236 (1957).

Tributylborine: A Catalyst for the Polyermization of Unsaturated Compounds, G. Kolesnikov and N.V. Klimentova, translated from *Bull. Acad. Sci. USSR, Div. Chem. Sci.* p. 653 (1957).

Triethylboron as an Initiator for Vinyl Polymerization, J. Furukawa, T. Tsuruta and S. Inoue, *Journal of Polymer Science*, vol. XXVI, Issue No. 113, pp. 234–236 (1957).

Oxygen Compounds as Cocatalyst for Triethylboron–Catalyzed Vinyl Polymerization, J. Furukawa and T. Tsuruta, *Journal of Polymer Science*, vol. XXVIII, Issue No. 116, pp. 227–229 (1958).

Mechanism of the Polymerization of Acrylonitrile in Presence of Tributylborine, G. Kolesnikov and L. Fedorova, translated from *Bull. Acad. Sci. USSR, Div. Chem. Sci.*, p. 906 (1958).

Mechanism of Trialkylboron Initiated Polymerization, J. Fordham and C. Sturm, *Journal of Polymer Science*, vol. XXXIII, No. 126, pp. 503–504 (1958).

Cocatalytic Activity of Some Metal Salts on Vinyl Polmerization with Tributhylboron, I. M. Panayotov, *Comptes rendus de l'Academie bulgare des Sciences*, vol. 14, No. 2, pp. 147–150 (1961).

Polymerization with Organoboron Compounds, F. Arimoto, *Journal of Polymer Science: Part A–1*, vol. 4, pp. 275–282 (1966).

On the Existence of a Free–Radical Organoboron Complex in the Polymerization of Methyl Methacrylate, R. Kern and J. Schaefer, *Polymer Letters*, vol. 5, pp. 157–162 (1967).

Vinyl Monomer Polymerization Mechanism in the Presence of Trialkylboranes, J. Grotewold, E. Lissi and A. Villa, *Journal of Polymer Science: Part A–1*, vol. 6, pp. 3157–3162 (1968).

Free–Radical Polymerization of Methyl Methacrylate in the Presence of Trialkylboranes, P. Brindley and R. Pearson, *Polymer Letters*, vol. 6, pp. 831–835 (1968).

Ethylene Polymerization in Presence of Tributylboron, G. Kolesnikov and T. Soboleva, *Scientific and Research Publications of the Members of the All Union Chemical Society Name After Mendilev*, vol. 2, p. 663 (1957).

Free–Radical Copolymerization of 1,2–Dichloroethylenes. Evidence for Chain Transfer by Chlorine Atom Elimination, T. Dawson, R. Lundberg and F. Welch, *Journal of Polymer Science: Part A–1*, vol. 7, pp. 173–181 (1969).

Mechanism of Vinyl Monomer Polymerization in the Presence of Trialkylboranes and Inhibitors, E. Aranchibia et al., *Journal of Polymer Science: Part A–1*, vol. 7, pp. 3430–3433 (1969).

Polymerization of Methyl Methacrylate by Trialkylborane–Pyridine System, K. Kojima et al., *Polymer Letters*, vol. 8, pp. 541–547 (1970).

Polymerization Initiated by Triethylborane–Peroxide Mixtures, E. Abuin et al., *Polymer Letters*, vol. 7, pp. 515–518 (1970).

Polymerization of Methyl Methacrylate by Co–ordination Compounds of Tri–n–butylborane with Some Electron–donating Compounds, Kojima et al., *Research Report of the Chiba University Faculty of Engineering*, vol. 22, No. 41, pp. 47–55.

Polymerization of Methyl Methacrylate Initiated by Tri–n–butylborane–Organic Halide Systems, M. Yoshikuni, M. Asami, S. Iwabuchi and K. Kojima, *Journal of Polymer Science*, vol. 11, pp. 3115–3124 (1973).

Polymerization of Methyl Methacrylate Initiated by Tributylborane–Pyridine System, Kojima et al., *Journal of the Japanese Chemical Society*, No. 11, pp. 2165–2171 (1972).

The Copolymerization of Vinylhydroquinone and Acrylonitrile by Tri–n–butylborane, S. Iwabuchi, M. Ueda, M. Kobayashi and K. Kojima, *Polymer Journal*, vol. 6, No. 2, pp. 185–190 (1974).

Free Radical Polymerization in the Presence of Triethylborane, E. Abuin, J. Cornejo and E. Lissi, *European Polymer Journal*, vol. 11, pp. 779–782 (1975).

Polymerization of Methyl Methacrylate by tri–n–butylborane in the presence of amino acid esters, K. Kojima, S. Iwabuchi, Y. Moriya and M. Yoshikuni, *Polymer*, vol. 16, pp. 601–604 (1975).

Analysis of Mechanism of Radical Formation Resulted from the Initiator System of Triethylboron and Oxygen by Spin Trapping Technique, Sato et al., *Journal of the Japanese Chemical Society*, No. 6, pp. 1080–1084 (1975).

Development of Adhesive Pit and Fissure Sealants Using a MMA Resin Initiated by a Tri–n–butyl Borane Derivative, N. Nakabayashi and E. Masuhara, *Journal of Biomedical Materials Research*, vol. 12, pp. 149–165 (1978).

Vinyl Acetate Polymerization Initiated by Alkylborane–oxidizer–type Systems, S. Ivanchev, L. Shumnyi and V. Konovalenko, *Polymer Science U.S.S.R.*, vol. 22, No. 12, pp. 8000–8006 (1980).

Preparation of Hard Tissue Compatible Materials: Dental Polymers, N. Nakabayashi and E. Masuhara, *Biomedical Polymers*, pp. 85–111 (1980).

Mechanism of Initiation of Polymerization of Vinyl Monomers by Means of the Trialkylborane–Acid System, S. Ivanchev and L. Shumnyi, translated from Doklady Akademii Nauk SSSR, vol. 270, No. 5, pp. 1127–1129 (1983).

Effect of Organic Bases on Initiating Properties in the System Boronalkylelemental Organic Peroixde During Vinylchloride Polymerization, T. Guzanova, Master Thesis of the Fifth (graduate) year student, Ministry of High and Secondary Special Education Russia, Gorky State University (1983).

Application of Spin Trapping Technique to Radical Polymerization, 20, T. Sato, N. Fukumura and T. Otsu, *Makromol. Chem.*, 184, pp. 431–442 (1983).

Importance of Polymerization Initiator Systems and Interfacial Initiation of Polymerization in Adhesive Bonding of Resin to Dentin, Y. Imai, Y. Kadoma, K. Kojima, T. Akimoto, K. Ikakura and T. Ohta, *J. Dent. Res.*, vol. 70, No. 7, pp. 1088–1091 (1991).

Vibrational Analysis by Raman Spectroscopy of the Interface Between Dental Adhesive Resin and Dentin, M. Suzuki, H. Kato and S. Wakumoto, *J. Dent. Res.*, vol. 70, No. 7, pp. 1092–1097 (1991).

Laser–Raman Spectroscopic Study of the Adhesive Interface Between 4–MET/MMA–TBB Resin and Hydroxyapatite or Bovine Enamel, M. Ozaki, M. Suzuki, K. Itoh and S. Wakumoto, *Dental Materials Journal*, vol. 10, No. 2, pp. 105–120 (1991).

Polymerization of Some Vinyl Monomers on Triisobutylboron–Containing Radical Initiators in the Presence of Hydroquinone and Benzoquinone, V. Dodonov and D. Grishin, *High Molecular Compounds*, vol. 35, No. 3, pp. 137–141 (1993).

Synthesis of PP–g–PMMA, PP–g–PVA and PP–g–PCL Copolymers, D. Rhubright and T. Chung, American Chemical Society, Division of Polymer Chemistry, Papers Presented at the Chicago, Illinois Meeting, vol. 34, No. 2, pp. 560–561 (1993).

Functionalized and Grafted Polyolefin Copolymers Prepared by Tansition Metal Catalysts and Borane Monomers, T. Chung, *Polymers Reprints*, vol. 35, No. 1, pp. 674–675 (1994).

Photochemical Modification of Fluorocargon Resin Surface to Adhere with Epoxy Resin, M. Okoshi, T. Miyokawa, H. Kashiura and M. Murahara, *Mat. Res. Soc. Symp. Proc.*, vol. 334, pp. 365–371 (1994).

Chemical Abstract No. 88532r, *Chemical Abstracts*, vol. 73, 1970.

Chemical Abstract No. 134385q, *Chemical Abstracts*, vol. 80, 1974.

Fujisawa et al., Characterization of the various complexes of tri–n–butyl borane as a polymer initiating agent in *Reports of the Institute for Medical and Dental Engineering* 3, 64–71 (1969).

Fujisawa et al., "Studies on Dental Self–Curing Resins (II)," *Reports of the Institute for Medical & Dental Engineering*, 3, pp. 64–71 (1969).

Official Gazette 1046 TMOG 2 Sep. 4, 1984.

5,872,197

INITIATOR SYSTEM AND ADHESIVE COMPOSITION MADE THEREWITH

This is a continuation of application Ser. No. 08/715,997 filed Sep. 19, 1996, now abandoned which is a division of application Ser. No. 08/515,187 filed Aug. 11, 1995 both now abandoned.

FIELD OF THE INVENTION

This invention relates generally to systems capable of initiating the polymerization of acrylic monomers. More specifically, the invention relates to those initiator systems comprising (1) organoborane amine complexes and (2) bireactive decomplexers. The invention further relates to the use of these systems for initiating the polymerization of acrylic monomers, as well as acrylic adhesive compositions made therewith. The adhesive compositions have good adhesion to low energy surfaces and excellent solvent resistance.

DESCRIPTION OF THE RELATED ART

Systems for initiating the polymerization of acrylic monomers to make adhesive compositions are known in the art. U.S. Pat. Nos. 5,106,928, 5,286,821, and 5,310,835, for example, disclose a two part initiator system that is reportedly useful in acrylic adhesive compositions. The first part of this two part system includes a stable organoborane amine complex and the second part includes an activator. The activator liberates the organoborane compound by removing the amine group, thereby allowing the organoborane compound to initiate the polymerization process.

The organoborane compound of the complex has the general formula:

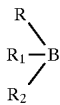

where R, $R_1$ and $R_2$ are either alkyl groups having 1 to 10 carbon atoms or phenyl groups. Useful amine compounds for the complex include n-octylamine, 1,6-diamnohexane, diethylamine, dibutylamine, diethylenetriamine, dipropylenediamine, ammonia, 1,3-propylenediamine, and 1,2-propylenediamine.

U.S. Pat. No. 5,286,821 reports that suitable activators for liberating the organoborane compound include aldehydes having the general structure:

wherein R is alkyl of 1 to 10 carbon atoms or aryl having 6 to 10 carbon atoms and x is 1 to 2. Examples include benzaldehyde, o-, m-, p-nitrobenzaldehyde, 2,4-dichlorobenzaldehyde, p-tolylaldehyde, and 3-methoxy-4 hydroxybenzaldehyde.

U.S. Pat. No. 5,310,835 reports that suitable activators also include organic acids having the structure:

wherein R is H, alkyl, or alkenyl having 1 to 8 carbon atoms. Examples include acrylic acid, methacrylic acid, benzoic acid, and p-methoxybenzoic acid.

Fujisawa, Imai, and Mashuhara also describe a system for initiating the polymerization of methyl methacrylate. See *Reports of the Institute for Medical and Dental Engineering*, 3, 64 (1969). The system comprises a trialkylborane amine complex and an activator such as the chloride of methacrylic or n-butane sulfonic acid, terephtalic acid chloride, benzoyl chloride, p-toluene sulfonic acid chloride, benzene sulfonic acid chloride, methane sulfonic acid chloride, toluene diisocyanate, adipic acid chloride, o-tolyl isocyanate, acetyl chloride, and anhydrous acetic acid. The initiator system is reportedly useful in providing fast curing resins for dental applications.

Activators (sometimes also referred to as decomplexers) liberate the organoborane compound by bonding (either covalently or ionicly) to the amine to form an activator-amine constituent. Most activator-amine constituents remain in the adhesive composition as a mobile constituent that is not incorporated into the polymerized adhesive per se. In general, mobile constituents in adhesive compositions may cause performance problems when, for example, they migrate to the surface of the adhesive thereby disrupting the bond interface. Mobile constituents are also susceptible to attack by solvents, thereby making the adhesive composition less suitable for applications where exposure to solvents is unavoidable.

A need therefore exists for an initiator system that provides an acrylic adhesive composition having a reduced level of mobile constituents and increased solvent resistance. Such an adhesive is less susceptible to performance problems due to migration of mobile constituents to the bond interface and can also be used in various manufacturing applications where adhesives are exposed to organic vapors, oils, fuels, and other solvents such as methylethylketone, tetrahydrofuran, and the like.

SUMMARY OF THE INVENTION

This invention provides systems capable of initiating the polymerization of acrylic monomers. More specifically, the invention provides initiator systems comprising (1) an organoborane amine complex and (2) a bireactive decomplexer. The term "decomplexer" means a compound capable of liberating the organoborane compound by bonding with the amine group, thereby allowing the organoborane to initiate the polymerization process. Decomplexers are also sometimes referred to as "activators" or "liberators." As used herein, each of these terms refers to a compound capable of liberating the organborane compound by bonding with the amine group. The term "bireactive" means that the decomplexer is capable of forming a covalent bond with both acrylic monomers and amine portion of the organoborane amine complex. Accordingly, the decomplexer is capable of covalently bonding to the liberated amine in the system and also reacting into the adhesive per se. This results in a reduced level of mobile constituents (i.e., those materials capable of migrating or diffusing through the cured adhesive). Furthermore, when the organoborane amine complex of the initiator system comprises a polyamine compound, polymerized acrylic compositions having improved solvent resistance are advantageously provided.

The decomplexer of the initiator system of the invention preferably comprises at least one free radically polymerizable group (for example, substituted alkenes) and at least one amine-reactive group in the same molecule. Preferably, each group is terminal. More preferably, the decomplexer comprises an acrylic group and an isocyanate group in the same molecule.

Preferred decomplexers include the reaction products of hydroxylated (meth)acrylates or adducts thereof and polyisocyanates or adducts thereof. The term "adduct" means addition-reaction product. The term "polyisocyanate" means a compound having at least two isocyanate groups. The term "(meth)acrylate" includes both acrylate and methacrylate. Preferred adducts of hydroxylated (meth)acrylates include hydroxyacrylate polyesters formed from lactones. Preferred adducts of polyisocyanates include those formed from active hydrogen containing compounds such as polyols, polythiols, polyamines and the like.

The system of the invention can be used to initiate the polymerization of acrylic monomer(s). Consequently, the invention also relates to a polymerizable acrylic composition that comprises at least one acrylic monomer, an effective amount of an organoborane amine complex, and an effective amount of the decomplexer of the invention for liberating the organoborane to initiate polymerization of the at least one acrylic monomer.

A wide variety of acrylic monomers may be used but those which are preferred include monofunctional acrylate ester, monofunctional methacrylate ester, substituted derivatives of the foregoing, and blends of the foregoing. Methacrylate esters are especially useful, particularly desirable examples of which include methyl methacrylate, ethyl methacrylate, butyl methacrylate, methoxy ethyl methacrylate, cyclohexyl methacrylate, tetrahydrofurfuryl methacrylate, and blends thereof. Blends of alkyl methacrylate (e.g., methyl methacrylate) and alkyl acrylate (especially those in which the alkyl group has from 4 to 10 carbon atoms, e.g., butyl acrylate) are also quite useful.

Acrylic compositions of the invention are uniquely useful in providing adhesives, and adhesive compositions of the invention advantageously provide reduced levels of mobile constituents, excellent solvent resistance, and adhesion to low surface energy plastics such as polyethylene, polypropylene, polytetrafluroethylene, and the like. The term "low energy surface" means those materials having a surface energy of less than 45 mJ/m$^2$, more typically less than about 35–40 mJ/m$^2$.

In another aspect, the invention relates to a method of initiating the polymerization of an acrylic monomer, the method comprising the steps of providing at least one acrylic monomer, blending the at least one acrylic monomer with the components of the polymerization initiator system according to the invention, and initiating polymerization of the at least one acrylic monomer. When the organoborane amine complex of the initiator system comprises a polyamine, this method may be used to prepare a polymerizable acrylic composition having improved solvent resistance.

DETAILED DESCRIPTION OF THE PREFERRED EMBODIMENTS

Decomplexer

The decomplexer of the invention preferably comprises at least one free radically polymerizable group and at least one amine-reactive group in the same molecule. Examples of useful decomplexers of the invention include the following:

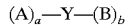

wherein "A" is a group that is capable of forming a covalent bond with acrylic monomer; "B" is a group that is capable of forming a covalent bond with the amine portion of the organoborane amine complex; "Y" is a polyvalent organic linking group; "a" represents the number of free radically polymerizable groups; and "b" represents the number of amine-reactive groups.

Group "A" preferably comprises free radically polymerizable such as an alkene group. The alkene group may be unsubstituted or substituted or part of a cyclic ring structure. Substituted alkenes include, for example, those alkenes having alkyl or aryl group substitution. Preferred alkenes are those having terminal unsubstituted double bonds such as allyl groups. Even more preferred alkenes are styryls, while the most preferred alkenes are acrylics.

Amine-reactive group "B" preferably comprises an isocyanate group. Because the decomplexer comprises at least one free radically polymerizable group and at least one amine-reactive group, the value of each of "a" and "b" is at least one. Preferably, the sum of "a" and "b" is less than or equal to six, more preferably less than or equal to four, most preferably two.

Polyvalent organic linking group "Y" may comprise a wide variety of different chemical structures depending on the reagents used to prepare the decomplexer. Preferably, the decomplexer comprises the reaction product of a hydroxyl compound containing a free radically polymerizable group and a, polyisocyanate. Useful hydroxyl compounds include those having the structure:

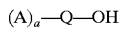

wherein "A" and "a" are defined above and Q is a polyvalent organic linking group such as, for example, an alkyl, aryl, cycloalkyl, alkylene ether or carbonyl group, or combinations thereof.

Preferred hydroxyl compounds include hydroxylated (meth)acrylates and (meth)acrylamides represented by the following structure:

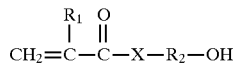

wherein $R_1$ is hydrogen, methyl, ethyl or chlorine; $R_2$ is an alkyl group preferably having 2 to 16 carbon atoms; and X is oxygen or $NR_3$ where $R_3$ is hydrogen or an alkyl group preferably having 1 to 4 carbon atoms. More preferably, $R_1$ is hydrogen or methyl, $R_2$ is an alkyl group having 2 to 4 carbon atoms, and X is oxygen.

Adducts of the above-mentioned hydroxylated (meth) acrylates or (meth)acrylamides with lactones are also particularly useful. The adducts, hydroxyacrylate polyesters, may be represented by the following structure:

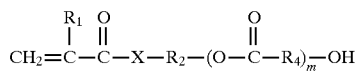

wherein $R_1$, $R_2$ and X are defined above, $R_4$ is an alkyl group preferably having 2 to 11 carbon atoms and m is an integer greater than or equal to 1. More preferably, $R_1$ is hydrogen or methyl, $R_2$ is an alkyl group having 2 to 4 carbon atoms, X is oxygen, $R_4$ is an alkyl group having 3 to 5 carbon atoms, and m is an integer from 1 to 4.

Useful polyisocyanates may be represented by the structure:

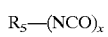

wherein $R_5$ is an alkyl, aryl, or an arylalkyl group and x is at least 2, more preferably between 2 and 4, inclusively. Examples of useful aromatic isocyanates include 1,4-phenylene diisocyanate, 2,4- and 2,6-toluene diisocyanate, diphenylmethane diisocyanate, 1,5-naphthalene diisocyanate, and triphenylmethane triisocyanate. Examples of useful aliphatic diisocyanates include 1,6-hexamethylene diisocyanate, 2,2,4-trimethylhexane diisocyanate, 1,4-cyclohexyl diisocyanate, isophorone diisocyanate, dicyclohexylmethane diisocyanate, and meta-tetramethylxylylene diisocyanate.

Other useful isocyanates include the oligomeric reaction products of any of the above aliphatic and aromatic isocyanates with each other. Examples include dimers having carbodiimide or uretdione linkage or trimers having biuret or isocyanurate linkages.

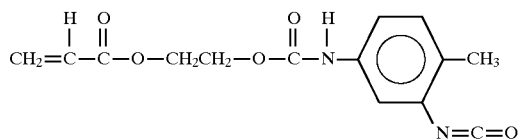

Other examples of decomplexers of the present invention include the following:

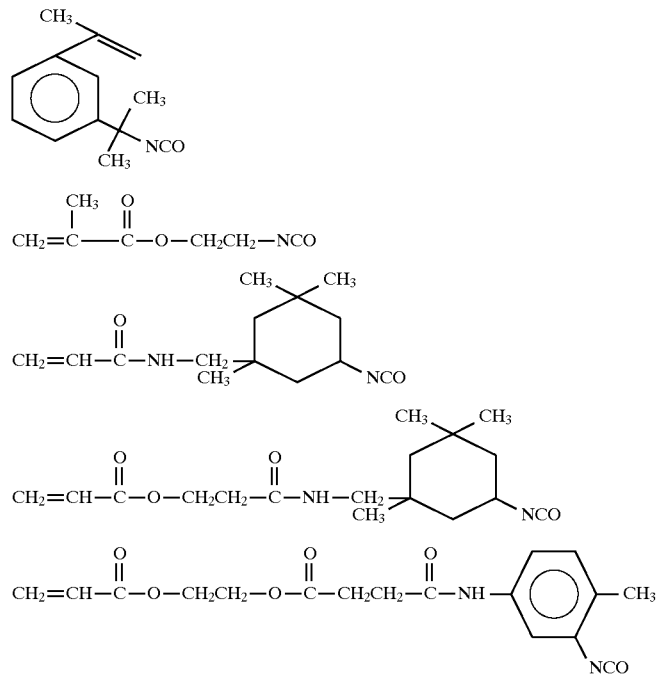

Adducts prepared by reacting a molar excess of the above polyisocyanates with active hydrogen containing compounds are also useful to make the decomplexer of the invention. Examples of useful active hydrogen containing compounds include polyols, polythiols, and polyamines. Examples of useful polyols include alkylene glycols such as 1,2-ethanediol, 1,4-butanediol, and 1,6-hexanediol; alkylene ether glycols such as diethylene glycol, tripropylene glycol, and poly(butylene glycol); polyhydroxy alkanes such as 4-cyclohexane dimethanol, glycerine, trimethylolpropane, and pentaerythritol. Examples of useful polythiols include 1,3-propanedithiol, 2,2'-dimercapto diethyl ether, 2,2'-dimercapto diethyl sulfide, triethylene glycol dimercaptan, and trimethylolethane tri(3-mercaptopropionate). Examples of useful polyamines include ethylenediamine, 1,3-diaminopropane, 1,6-hexanediamine and 4,7,10-trioxa-1,13-tridecanediamine.

The most preferred decomplexers of the invention comprise the reaction product of isophorone diisocyanate (IPDI) with hydroxyethylmethacrylate (HEMA), hydroxyethylacrylate (HEA), or hydroxybutylacrylate (HBA); IPDI or toluene diisocyanate (TDI) with either the adduct of HEA and caprolactone or HEMA and caprolactone, and TDI with HEA.

For example, the decomplexer comprising the reaction product of TDI and HEA may be represented as follows:

As stated previously, the decomplexer of the invention comprises at least one free radically polymerizable group and at least one isocyanate group in the same molecule. The total number of each type of group depends on the molar ratio and chemical structure of the starting reagents used to make the decomplexer. For example, when a triisocyanate is reacted with one mole of a hydroxylated (meth)acrylate, the resulting decomplexer is expected to have two isocyanate groups and one free radically polymerizable group. By adjusting the molar ratio, however, it is possible to obtain one isocyanate group and two free radically polymerizable groups.

The decomplexer of the invention may be prepared by allowing the starting reagents (for example, hydroxylated (meth)acrylate and diisocyanate) to react in the presence of a catalyst (such as dibutyltindilaurate) that creates urethane linkages and optionally a free radical inhibitor (typically a phenolic compound such as hydroquinone monomethylether or butylated hydroxy toluene). When the starting reagents are a mono-hydroxylated (meth)acrylate and diisocyanate, the molar ratio of the former to the latter is preferably 0.9–1.1:1; more preferably an equimolar quantity of each is used to provide an NCO to OH equivalent ratio of 2:1. The catalyst is typically provided at a level of 0.01 weight percent based on the total amount of decomplexer prepared. The free radical inhibitor (if used) is typically provided at a level of 600 parts by weight per million parts by weight decomplexer. Additional protection against premature free radical polymerization may be provided by bubbling dry air through the co-reactants. The reaction is conveniently carried out at room temperature.

Organoborane Amine Complex

In general, complexes of the invention are complexes of organoborane and amine. Such complexes may be represented by the structure:

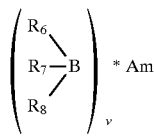

$R_6$ is an alkyl group having 1 to 10 carbon atoms. $R_7$ and $R_8$ are independently selected from alkyl groups having 1 to 10 carbon atoms and phenyl-containing groups. Preferably, $R_6$, $R_7$ and $R_8$ are independently selected alkyl groups having 1 to 5 carbon atoms. Most preferably, they are the same.

The value of v is selected so as to provide an effective ratio of primary or secondary amine nitrogen atoms to boron atoms in the complex. The ratio of primary or secondary amine nitrogen atoms to boron atoms in the complex should broadly be about 0.5:1 to 4:1.

The amine, Am, may comprise a variety of structures, for example, any primary or secondary amine, polyamine containing a primary or secondary amine, or ammonia. When solvent resistance in the ultimate polymerized acrylic composition is desired, Am preferably comprises a polyamine.

For example, Am may represented by the structure:

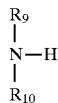

where $R_9$ and $R_{10}$ are hydrogen, alkyl of 1 to 10 carbon atoms, ethanol or

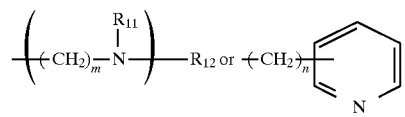

where $R_{11}$ and $R_{12}$ are hydrogen or alkyl of 1 to 10 carbon atoms, m is greater than 2, and n is 1 to 6. The alkyl groups in these formulae may comprise straight or branched chains. Illustrative compounds include n-octylamine, 1,6-diaminohexane, diethylamine, dibutylamine, dipropylenediamine, diethylenetriamine, ammonia, 1,3-propylenediamine, and 1,2-propylenediamine.

Alternatively, Am may be a polyoxyalkylenepolyamine having a structure such as $$H_2NR_{13}O\text{—}(R_{14}O)_w\text{—}(R_{15}O)_x\text{—}(R_{14}O)_y\text{—}R_{13}NH_2 \qquad (I)$$

or $$[H_2NR_{13}O\text{—}(R_{14}O)_w]_z\text{—}R_{17} \qquad (II).$$

$R_{13}$, $R_{14}$ and $R_{15}$ are preferably alkylene groups having 1 to 10 carbon atoms which may be the same or different. More preferably, $R_{13}$ is an alkyl group having 2 to 4 carbon atoms, $R_{14}$ is an alkyl group of 2 or 3 carbon atoms, and $R_{15}$ is an alkyl group of 2 or 3 carbon atoms. $R_{17}$ is a residue of a polyol used to prepare the polyoxyalkylenepolyamine (i.e., the organic structure that remains when the hydroxyl groups are removed). $R_{17}$ may be branched or linear, saturated or unsaturated, and substituted or unsubstituted.

The value of w is $\geq 1$ (more preferably about 1 to 150, and most preferably about 1 to 20). The value of x and y are $\geq 0$. The value of z is $>2$ (more preferably 3 or 4).

Examples of useful polyoxyalkylenepolyamines include polyethyleneoxidediamine, polypropyleneoxidediamine, diethyleneglycolpropylenediamine, triethyleneglycolpropylenediamine, polytetramethyleneoxidediamine, and polyethyleneoxide-co-polypropyleneoxidediamine.

Examples of useful commercially available polyoxyalkylenepolyamines include various JEFFAMINES from Huntsman Chemical Company such as the D, ED, EDR, and T series diamines (e.g., D-400, D-2000, D-5000, ED-600, ED-900, ED-2001, EDR-148 and T403), DCA-221 from Dixie Chemical Company.

Alternatively, the amine, Am, may comprise the reaction product of one or more diprimary amine-terminated materials (i.e., the two terminal groups are primary amine) and one or more materials containing at least two groups reactive with the primary amine (the latter may be referred to as a "difunctional primary amine-reactive" material). In this case, Am may be represented by the structure:

$$E\text{—}(L\text{—}E)_q\text{—}L\text{—}E \qquad (III)$$

in which each E group is the residue of the diprimary amine-terminated material and each L is a linking group that is the residue of the material having at least two groups reactive with primary amine. The term "residue" means those portions of the diprimary amine-terminated material and the difunctional primary amine-reactive material that remain after reaction to form the polyamine adduct. The integral value of q is $\geq 0$ (more preferably, it is from 0 to 5, and most preferably it is 0 or 1).

Useful diprimary amine-terminated materials (E) include alkyl diprimary amines, aryl diprimary amines, alkaryl diprimary amines, polyoxyalkylenediamines such as those represented by structure I described above, and mixtures thereof. A particularly preferred material for E is an aliphatic oxyalkylene diamine sold as DCA-221 from Dixie Chemical Company.

Suitable candidates for the material having at least two groups reactive with primary amine (L) may be represented by the general structure W—R—Z, wherein W and Z are moieties independently selected from the group consisting of carboxylic acid, carboxylic acid halide, ester, aldehyde, epoxide, amino alcohol, and acrylic, and R is a divalent organic radical. Most preferably W and Z are the same. A particularly preferred material for L is hexanedioldiacrylate.

Initiator System

The initiator systems of the invention are especially useful in polymerizing acrylic monomers, particularly for making polymerizable acrylic adhesives. The organoborane amine complex is employed in an effective amount, which is an amount large enough to permit polymerization to readily occur to obtain a polymer (preferably, an acrylic polymer) of high enough molecular weight for the desired end use. If the amount of organoborane amine complex is too low, then the polymerization may be incomplete or, in the case of adhesives, the resulting composition may have poor adhesion. On the other hand, if the amount of organoborane amine complex is too high, then the polymerization may proceed too rapidly to allow for effective mixing and use of the resulting composition. Large amounts of complex could also lead to the generation of large volumes of borane, which, in the case of an adhesive, could weaken the bondline. The useful rate of polymerization will depend in part on the method of applying the composition to a substrate. Thus, a faster rate of polymerization may be accommodated by using a high speed automated industrial adhesive applicator rather than by applying the composition with a hand applicator or by manually mixing the composition.

Within these parameters, an effective amount of the organoborane amine complex is an amount that preferably provides about 0.03 to 1.5 weight % boron, based on the total weight of the adhesive composition, more preferably about 0.04 to 0.60 weight % boron.

The weight % of boron in a composition is equal to the following:

$$\frac{\text{(weight of complex in the composition)} \times \text{(weight \% of boron in the complex)}}{\text{(Total weight of composition)}}$$

The organoborane decomplexer liberates organoborane by reacting with the amine, thereby removing the organoborane from chemical attachment with the amine.

The decomplexer is employed in an effective amount; that is, an amount effective to promote polymerization by liberating organoborane from the complex but without materially adversely affecting the properties of the ultimate polymerized composition. Larger amounts of decomplexer may permit the polymerization to proceed too quickly and, in the case of adhesives, the resulting materials may demonstrate inadequate adhesion to low energy surfaces. If small amounts of decomplexer are employed, the rate of polymerization may be too slow and the monomers that are being polymerized may not adequately increase in molecular weight. However, a reduced amount of decomplexer may be helpful in slowing the rate of polymerization if it is otherwise too fast.

Within these parameters, the decomplexer may be provided in an amount wherein the number of equivalents of amine reactive groups is as much as twice stoichiometric with the number of amine groups in the organoborane amine complex. The number of amine groups includes both primary and secondary amine groups if the amine is a polyamine. However, it is much more preferred that the number of equivalents of amine reactive groups be stoichiometric with the total number of amine groups in the organoborane amine complex.

Compositions

The initiator systems of the invention are useful in providing polymerizable acrylic monomer compositions. "Acrylic monomers" are polymerizable monomers having one or more acrylic or substituted acrylic moieties, chemical groups or functionality; that is, groups having the general structure

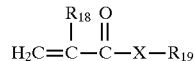

wherein $R_{18}$ and $R_{19}$ are hydrogen or organic radicals, and X is oxygen or $NR_3$ where $R_3$ is hydrogen or an alkyl group preferably having 1 to 4 carbon atoms. Where $R_{18}$ and $R_{19}$ are organic radicals, they may be the same or they may be different. Blends of acrylic monomers may also be used. The polymerizable acrylic monomer may be monofunctional, polyfunctional or a combination thereof.

The most useful monomers are monofunctional acrylate and methacrylate esters or amides and substituted derivatives thereof such as cyano, chloro, and silane derivatives as well as blends of substituted and unsubstituted monofunctional acrylate and methacrylate esters and amides. Particularly preferred monomers include lower molecular weight methacrylate esters and amides such as methyl methacrylate, ethyl methacrylate, butyl methacrylate, methoxy ethyl methacrylate, cyclohexyl methacrylate, tetrahydrofurfuryl methacrylate, N,N-dimethyl methacrylamide and blends thereof.

Acrylate esters and amides and higher molecular weight methacrylate esters and amides are less preferred for use alone, but can be especially usefully employed as modifying monomers with predominating amounts of lower molecular weight methacrylate esters and amides so as to, for example, enhance the softness or flexibility of the ultimate composition. Examples of such acrylate esters and amides and higher molecular weight methacrylate esters and amides include methyl acrylate, ethyl acrylate, isobornyl methacrylate, butyl acrylate, n-octyl acrylate, 2-ethylhexyl acrylate, 2-ethylhexyl methacrylate, decylmethacrylate, dodecyl methacrylate, tert-butyl methacrylate, acrylamide, N-methyl acrylamide, diacetone acrylamide, N-tert-butyl acrylamide, N-tert-octyl acrylamide, N-decyl methacrylamide, gamma-methacryloxypropyl trimethoxysilane, 2-cyanoethyl acrylate, 3-cyanopropyl acrylate, tetrahydrofurfuryl chloroacrylate, glycidyl acrylate, glycidyl methacrylate, and the like. Dimethylaminoethyl acrylate and dimethylaminoethyl methacrylate may also be used as modifying agents although additional organoborane liberator may be required due to the extra amine groups.

Particularly preferred are blends of any of the lower molecular weight alkyl methacrylate esters described above with alkyl acrylates having 4 to 10 carbon atoms in the alkyl group, such as blends of methyl methacrylate and butylacrylate. Polymerizable compositions of this type may broadly comprise, based on the total weight of the composition, about 2 to 50 wt. % of the alkyl acrylate and, correspondingly, about 50 to 98 wt. % of the alkyl methacrylate.

Other useful monomers that can be used include di- or higher functional (meth)acrylates (for example, hexanedioldiacrylate, ethylene glycol dimethacrylate, ethylene glycol diacrylate, triethylene glycol dimethacrylate, polyethylene glycol diacrylate, tetraethylene glycol di(meth) acrylate, glycerol diacrylate, diethylene glycol dimethacrylate, pentaerythritol triacrylate, trimethylolpropane trimethacrylate, as well as other polyether diacrylates and dimethacrylates).

The above-discussion of acrylic monomers is not intended to be exhaustive. Other acrylic monomers are known in the art and may be used in the present invention.

The compositions may further comprise a variety of optional additives. One particularly useful additive is a thickener such as medium (about 100,000) molecular weight polymethyl methacrylate which may be incorporated in an amount of about 10 to 40 weight %, based on the total weight of the composition. Thickeners may be employed to increase the viscosity of the composition to a more easily applied viscous syrup-like consistency.

Another particularly useful additive is an elastomeric material. These materials can improve the fracture toughness of compositions made therewith which can be beneficial when, for example, bonding stiff, high yield strength materials such as metal substrates that do not mechanically absorb energy as easily as other materials, such as flexible polymeric substrates. Such additives can be incorporated in an amount of about 5% to 35% by weight, based on the total weight of the composition.

Useful elastomeric modifiers include chlorinated or chlorosulphonated polyethylenes such as HYPALON 30

(commercially available from E. I. duPont de Nemours and Co., Wilmington Del.). Also useful, and even more preferred, are certain graft copolymer resins such as particles that comprise rubber or rubber-like cores or networks that are surrounded by relatively hard shells, these materials often being referred to as "core-shell" polymers. Most preferred are the acrylonitrile-butadiene-styrene graft copolymers.

In addition to improving the fracture toughness of the composition, core-shell polymers can also impart enhanced spreading and flow properties to the uncured composition. These enhanced properties may be manifested by a reduced tendency for the composition to leave an undesirable "string" upon dispensing from a syringe-type applicator, or sag or slump after having been applied to a vertical surface. Use of more than about 20% of a core-shell polymer additive is desirable for achieving improved sag-slump resistance.

Peroxides may be optionally included (typically in an amount of about 2% by weight or less, based on the total weight of the composition), for example, to adjust the speed at which the compositions polymerize or to complete the polymerization.

Small amounts of inhibitors such as hydroquinone monomethylether may be used, for example, to prevent or reduce degradation of the acrylic monomers during storage. Inhibitors may be added in an amount that does not materially reduce the rate of polymerization or the ultimate properties of an adhesive or other composition made therewith, typically about 100–10,000 ppm based on the weight of the polymerizable monomers.

Other possible additives include non-reactive colorants, fillers (e.g., carbon black), etc. provided they are dried sufficiently to reduce moisture content below about 0.1% by weight based on the total weight of the additives.

The various optional additives are employed in an amount that does not significantly adversely affect the polymerization process or the desired properties of compositions made therewith.

Polymerizable acrylic compositions according to the invention may be used in a wide variety of ways, including as sealants, coatings, and injection molding resins. They may also be used as matrix resins in conjunction with glass and metal fiber mats such as in resin transfer molding operations. They may further be used as encapsulants and potting compounds such as in the manufacture of electrical components, printed circuit boards and the like. Quite desirably, they provide polymerizable acrylic adhesive compositions that can bond a diverse myriad of substrates, including polymers, wood, ceramics, concrete, and primed metals.

The polymerizable compositions of the invention can be easily used as two-part adhesives. The components of the polymerizable composition are blended as would normally be done when working with such materials. The decomplexer of the polymerization initiator system is usually included in this blend so as to separate it from the organoborane amine complex, thus providing one part of the two-part composition. The organoborane amine complex of the polymerization initiator system provides the second part of the composition and is added to the first part shortly before it is desired to use the composition. The complex may be added to the first part directly or it may be predissolved in an appropriate carrier such as a small amount of methyl methacrylate.

For a two-part adhesive such as those of the invention to be most easily used in commercial and industrial environments, the ratio at which the two parts are combined should be a convenient whole number. This facilitates application of the adhesive with conventional, commercially available dispensers. Such dispensers are shown in U.S. Pat. Nos. 4,538,920 and 5,082,147 and are available from Conprotec, Inc. (Salem NH) under the tradename "Mixpac."

Once the two parts have been combined, the composition should be used quickly, as the useful pot life may be short depending upon the acrylic monomer mix, the amount of complex, and the temperature at which the bonding is to be performed.

The polymerizable composition is applied to one or both substrates and then the substrates are joined together with pressure to force excess composition out of the bond line. This also has the advantage of displacing composition that has been exposed to air and that may have advanced too far in cure. In general, the bonds should be made shortly after the composition has been applied, preferably within about 10 minutes. The typical bond line thickness is about 0.1 to 0.3 mm but may exceed 1.0 mm when gap filling is needed. The bonding process can easily be carried out at room temperature and to improve the degree of polymerization it is desirable to keep the temperature below about 40° C., preferably below 30° C., and most preferably below about 25° C.

The bonds will cure to a reasonable green strength to permit handling of the bonded components within about 1 hour. Full strength will be reached in about 24 hours under ambient conditions; post-curing with heat (typically about 80° C.) may be used if desired.

The invention will be more fully appreciated with reference to the following nonlimiting examples in which (unless noted otherwise) all weights are given as weight percents (weight %), based on the total weight of the composition which is 100 weight %.

EXAMPLES

Bond Strength Test Method

The adhesive compositions described below were tested for bond strength. The base component of a given adhesive formulation (comprising a thorough mixture of thickened monomers and decomplexer) was combined with the organoborane polyamine complex (referred to as the accelerator component) and mixed with a spatula for one minute. The adhesive was then applied to a 2 inch (5.1 cm) wide, 6 inch long (15.2 cm), 8 mil (0.2 mm) thick film. The film was held flat using two 30 mil (0.8 mm) thick aluminum overlays, the overlays overlapping 0.5 inch (1.3 cm) along the entire length of each side of the film.

Each adhesive formulation was tested on two different film substrates, skived polytetrafluoroethylene (PTFE) and skived ultrahigh molecular weight polyethylene (PE). Neither of the films had any surface treatment.

Once the adhesive was applied to the first film, a second film comprising the same substrate was eased onto the adhesive using a 2.7 lb (1.2 kg) weighted glass plate. One side of the glass plate was applied to one side of the second film at an angle of about 30 degrees and then gradually lowered to a horizontal position so that the second film was applied incrementally to the first to avoid formation of bubbles in the adhesive. Sufficient adhesive was applied to the first film to provide minimum bond dimensions of 1 inch (2.5 cm) in width by 1.5 inch (3.8 cm) in length.

The bonded adherends were allowed to cure for 24 hours at room temperature (21°–25° C.). The samples were then tested for bond strength in the T-peel mode using an Instron Tensile Tester set at a crosshead speed of 4 inches/min (10.2 cm/min). Two overlapping free ends of the sample were clamped into the jaws of the Instron tester, one free end in the upper jaw and one free end in the lower jaw. The jaws were then pulled apart until at least 1 inch (2.5 cm) of adhesive was exposed. The average force per width during the run after the adhesive was initially exposed was recorded as the Peel Strength in pounds/inch width (piw).

The tensile strengths of PTFE and PE films were found to be 11 pounds/inch width (20 N/cm width) and 25 pound/inch width (44 N/cm width), respectively. Preferably, the Peel Strength values approximate the tensile strength values, indicating substrate as opposed to adhesive failure.

Solvent Resistance

2–3 gram remnants of each adhesive formulation (leftover from the above-test) were sealed in their 20 cm³ glass mixing vials for 24 hours at room temperature (21°–25° C.) after the bonds described above were prepared. The vial plus adhesive was then weighed to give the value denoted below as W1. The contents of each vial were then soaked in tetrahydrofuran (THF) for at least 24 hours until sufficiently swollen to be removed. When necessary, a spatula was used to break up the mass to facilitate removal. The mass of each vial was transferred into its own 4 ounce (118 cm³) glass jar, and the empty vial was dried and weighed to give the value denoted below as W2. Additional THF was added to each glass jar to bring the solids content to 5% by weight. The jar was capped and placed on a roll mixer for at least 24 hours. The fluid mixture was then poured into a medium mesh conical gauze/paper paint filter (available from Foremost Co. and having a weight denoted below as W3) and thoroughly rinsed with THF. Filters were dried in an 80° C. forced air oven for one hour.

The filters were allowed to equilibrate overnight at room temperature before being weighed to give the value denoted below as W4. Adhesive percent solids was then calculated as follows:

$$\text{Percent Solids} = \frac{W4 - W3 + 0.0174}{W1 - W2} \times 100$$

It is noted that a correction factor of 0.0174 milligrams was added to W4–W3 in the equation above to account for that portion of the filter that was lost by virtue of the process conditions.

Percent Gel was then calculated for samples of the invention by dividing the Percent Solids (calculated as described above) by the weight percent of the adhesive which is capable of addition polymerization (i.e., the portion derived from the acrylic monomers, the amine part of the complex, and the decomplexer). A sample calculation is provided below for Example 1 of the invention:

$$\text{Percent Gel} = \frac{\text{Percent Solids} \times 100}{\text{Percent Capable of Add'n Polymerization}}$$

$$(\text{Percent Gel})_{Ex1} = \frac{(\text{Percent Solids})_{Ex1} \times 100}{(\text{Wt. \%}_{MMA} + \text{Wt. \%}_{BA} + \text{Wt. \%}_{DC} + \text{Wt. \%}_{AmC})}$$

where Wt. $\%_{MMA}$ is the weight percent of methyl methacrylate, Wt. $\%_{BA}$ the weight percent of butyl acrylate, Wt. $\%_{DC}$ is the weight percent of decomplexer, and Wt. $\%_{AmC}$ is the weight percent of the amine portion of the complex used in Example 1. The Percent Solids of Example 1 can be found from Table V to be 68. Example 1 comprised Initiator In-1 given in Table III. The organoborane portion (triethylborane) has a molecular weight of 98, while the amine portion (1,6-hexanediamine) has a molecular weight of 116. Table IV indicates that the weight percent of Initiator was 2.510. Thus, the value of Wt. $\%_{AmC}$ can be calculated as follows:

$$\text{Wt. \%}_{AmC} = (2.510) \frac{(116)}{(312)}$$

$$\text{Wt. \%}_{AmC} = 0.933$$

The (Percent Gel)$_{Ex1}$ can now be calculated from the other weight percents listed in Table IV as follows:

$$(\text{Percent Gel})_{Ex1} = \frac{68 \times 100}{(41.179 + 27.452 + 5.982 + 0.933)}$$

$$(\text{Percent Gel})_{Ex1} = 90\%.$$

Small deviations from table values are due to rounding of Percent Solids values.

In a similar fashion, Percent Solids and Percent Gel were calculated for cured films recovered from the samples prepared for the Bond Strength Test described.

Decomplexer Synthesis

Preparation of Aliphatic Isocyanato (Meth)acrylates Dibutyltindilaurate (DBTDL) catalyst and 2,6-di-t-butyl-4-methylphenol inhibitor were charged to a 50 ml glass vial in weight ratios specified in Table I. These charges were followed with charges of isophorone diisocyanate (IPDI) and a selected hydroxylated (meth)acrylate also specified in Table I. The selected hydroxylated (meth)acrylate had been dried over a bed of 4Å molecular sieves prior to charging and the molar ratio of IPDI to selected hydroxylated (meth) acrylate was 1:1. The charges were mixed thoroughly while purging the glass vial with a stream of dry air. The vial was then sealed tightly to exclude moisture and placed in a water bath at room temperature (about 25° C.). The contents of the vial were allowed to react for at least 24 hours before use. These aliphatic derivatives were designated as decomplexers A–E in Table I.

Preparation of Aromatic Isocyanato (meth)acrylates The above procedure was modified to prepare aromatic derivatives. The DBTDL catalyst was eliminated and the reaction time was increased to 48 hours. The IPDI was replaced with 2,4-diisocyanatotoluene (Mondur TDS) available from Miles Inc. The selected hydroxylated (meth)acrylates were neutralized prior to charging. The 2-hydroxyethylacrylate was neutralized with 0.14% orthophosphoric acid and then passed through a column of activated silica gel. The selected hydroxylated (meth)acrylates, Tone® M-100 and Tone® M-200 (available from Union Carbide) were neutralized by forming a slurry with activated silica gel and then decanting through glass wool. The aromatic derivatives have been designated as decomplexers F–H in Table I.

TABLE I

Bireactive Decomplexers

| Decomplexer | Wt. % DBTDL | Wt. % BHT | Isocyanate Name | Wt. % | Hydroxylated (Meth)acrylate Name[1] | Wt. % |
|---|---|---|---|---|---|---|
| A | 0.010 | 0.043 | IPDI | 65.646 | HEA | 34.301 |
| B | 0.010 | 0.050 | IPDI | 63.030 | HEMA | 36.910 |
| C | 0.010 | 0.040 | IPDI | 60.625 | HBA | 39.325 |
| D | 0.010 | 0.020 | IPDI | 39.490 | M-100 | 60.480 |
| E | 0.010 | 0.047 | IPDI | 38.254 | M-200 | 61.689 |
| F | 0.010 | 0.043 | TDS | 59.968 | HEA | 39.979 |
| G | 0.010 | 0.013 | TDS | 33.844 | M-100 | 66.133 |
| H | 0.010 | 0.047 | TDS | 32.688 | M-200 | 67.255 |

[1]HEA = Hydroxyethyl acrylate
HEMA = Hydroxyethyl methacrylate
HBA = Hydroxybutyl acrylate
M-100 = Tone ® M-100
M-200 = Tone ® M-200

Comparative Decomplexers

Decomplexers which were used for comparison with the decomplexers of the present invention are designated as decomplexers I–N in Table II below. The m-TMXDI is meta-tetramethylxylene diisocyanate available from American Cyanamide and the Isonate 2143L is a noncrystallizing version of 4,4'-diphenylmethane diisocyanate available from Dow Chemical Co.

TABLE II

Comparative Decomplexers

| Decomplexer | Name |
|---|---|
| I | benzaldehyde |
| J | methacrylate acid |
| K | IPDI |
| L | m-TMXDI |
| M | Mondur TDS |
| N | Isonate 2143L |

Initiators

The organoborane amine complex initiators used in the present invention are listed in Table III below. All were prepared with triethyl borane using a 1:1 boron to nitrogen ratio. The organoborane polyamine complexes may be readily prepared using known techniques. Typically, the polyamine is combined with the organoborane in an inert atmosphere with slow stirring. An exotherm is often observed and cooling of the mixture is therefore recommended. If the ingredients have a high vapor pressure, it is desirable to keep the reaction temperature below about 70° to 80° C. Once the materials have been well mixed the complex is permitted to cool to room temperature. No special storage conditions are required although it is preferred that the complex be kept in a capped vessel in a cool, dark location. Advantageously, the complexes can be prepared in the absence of organic solvents that would later have to be removed, although they could be prepared in solvent if so desired. Solvents used in the preparation of the complexes should, preferably, be ones that do not coordinate amines, for example, tetrahydrofuran or hexane.

TABLE III

Organoborane Amine Complex Initiators

| Initiator | Organoborane | Amine |
|---|---|---|
| In-1 | triethylborane | 1,6-hexanediamine |
| In-2 | triethylborane | Jeffamine T-403 triamine[1] |
| In-3 | triethylborane | Jeffamine ED-600 diamine[1] |
| In-4 | triethylborane | E-L-E diamine[2] |

[1] available from Huntsman Corp
[2] 2:1 molar adduct of DCA-221 diamine (Dixie Chemical Co.) and 1,6-hexanediol diacrylate Adhesive Compositions (examples 1–20 and comparative examples 21–27)

Two part adhesive compositions were prepared according to Table IV below. The weight percent of each component based upon total composition weight is shown in this table.

The two part adhesives of this invention comprise an accelerator component and a base component. The accelerator component in all examples was solely the organoborane amine complex initiator.

The base component comprised a thickened acrylic monomer mixture to which has been added an effective amount of decomplexer. The monomer mixture was a 60:40 blend by weight of methyl methacrylate (MMA) and butyl acrylate (BA) in a 25% solution of 101,000 molecular weight poly (>95% methyl methacrylate-co-<5% ethyl acrylate) (PMMA) available from Aldrich Chemical Co.

Unless otherwise indicated, the standard formulation provided 2.5 moles of triethylborane for every 100 moles of free-radically polymerizable (meth)acrylate groups and 1.1 moles of amine-reactive groups for each mole of initiator groups.

TABLE IV

Adhesive Compositions

| | | Base | | Decomplexer | | Accelerator | | |
|---|---|---|---|---|---|---|---|---|
| Example | Wt % MMA | Wt % BA | Wt % PMMA | Type | Wt % | Initiator | Wt % | Borane[1] |
| 1 | 41.179 | 27.452 | 22.877 | A | 5.982 | In-1 | 2.510 | 2.5 |
| 2 | 41.077 | 27.385 | 22.820 | B | 6.214 | In-1 | 2.504 | 2.5 |
| 3 | 40.975 | 27.317 | 22.764 | C | 6.446 | In-1 | 2.498 | 2.5 |
| 4 | 40.292 | 26.861 | 22.384 | C | 6.338 | In-2 | 4.125 | 2.5 |
| 5 | 39.122 | 26.081 | 21.734 | C | 6.154 | In-4 | 6.909 | 2.5 |
| 6 | 39.608 | 26.406 | 22.005 | D | 9.567 | In-1 | 2.414 | 2.5 |
| 7 | 37.727 | 25.152 | 20.960 | D | 12.905 | In-1 | 3.256 | 3.5 |
| 8 | 35.151 | 23.434 | 19.528 | D | 17.477 | In-1 | 4.410 | 5.0 |
| 9 | 32.106 | 21.404 | 17.837 | D | 22.880 | In-1 | 5.773 | 7.0 |
| 10 | 28.213 | 18.809 | 15.674 | D | 29.787 | In-1 | 7.517 | 10.0 |
| 11 | 39.487 | 26.325 | 21.937 | E | 9.844 | In-1 | 2.407 | 2.5 |
| 12 | 41.531 | 27.688 | 23.073 | F | 5.177 | In-1 | 2.531 | 2.5 |
| 13 | 44.277 | 29.518 | 24.598 | F | 1.079 | In-1 | 0.528 | 0.5 |
| 14 | 39.934 | 26.623 | 22.186 | G | 8.823 | In-1 | 2.434 | 2.5 |
| 15 | 40.875 | 27.250 | 22.709 | G | 7.184 | In-1 | 1.982 | 2.0 |
| 16 | 41.850 | 27.900 | 23.25 | G | 5.486 | In-1 | 1.514 | 1.5 |
| 17 | 42.862 | 28.575 | 23.812 | G | 3.724 | In-1 | 1.027 | 1.0 |
| 18 | 43.911 | 29.274 | 24.395 | G | 1.897 | In-1 | 0.523 | 0.5 |
| 19 | 39.811 | 26.541 | 22.117 | H | 9.104 | In-1 | 2.427 | 2.5 |
| 20 | 38.252 | 25.502 | 21.251 | H | 8.747 | In-3 | 6.248 | 2.5 |
| Comp 21 | 42.996 | 28.664 | 23.887 | I | 1.905 | In-1 | 2.548 | 2.5 |
| Comp 22 | 42.453 | 28.302 | 23.585 | J | 2.137 | In-1 | 3.523 | 3.4 |
| Comp 23 | 42.126 | 28.084 | 23.403 | J | 2.891[2] | In-1 | 3.496 | 3.3 |
| Comp 24 | 42.957 | 28.638 | 23.865 | K | 1.993 | In-1 | 2.547 | 2.5 |

TABLE IV-continued

Adhesive Compositions

| Example | Base | | | Decomplexer | | Accelerator | | Borane[1] |
|---|---|---|---|---|---|---|---|---|
| | Wt % MMA | Wt % BA | Wt % PMMA | Type | Wt % | Initiator | Wt % | |
| Comp 25 | 42.872 | 28.582 | 23.818 | L | 2.186 | In-1 | 2.542 | 2.5 |
| Comp 26 | 43.143 | 28.762 | 23.968 | M | 1.569 | In-1 | 2.558 | 2.5 |
| Comp 27 | 42.704 | 28.470 | 23.725 | N | 2.570 | In-1 | 2.531 | 2.5 |

[1]moles/100 moles (meth)acrylate vinyl groups
[2]1.5 moles of carboxylic acid groups for each mole of initiator amine groups The bond strengths and solvent resistance of the adhesive formulations were determined using methods described above. Results are shown in Table V.

TABLE V

Bond Strength and Solvent Resistance

| | Bond Strength | | | | Solvent Resistance | |
|---|---|---|---|---|---|---|
| | PTFE | | PE | | | |
| Example | piw | N/cm | piw | N/cm | % Solids | % Gel |
| 1 | 6 | 10 | 12 | 21 | 68 | 89 |
| 2 | 6 | 10 | 3 | 5 | 66 | 87 |
| 3 | 6 | 10 | 14 | 25 | 64 | 85 |
| 4 | 9 | 16 | 2 | 4 | 73 | 96 |
| 5 | 5 | 9 | 10 | 17 | 60 | 78 |
| 6 | 5 | 9 | 10 | 17 | 67 | 88 |
| 7 | 7 | 12 | 5 | 9 | 69 | 90 |
| 8 | 9 | 16 | 2 | 4 | 71 | 91 |
| 9 | 11 | 19 | 1 | 2 | 73 | 93 |
| 10 | 10 | 17 | 1 | 2 | 76 | 95 |
| 11 | 5 | 9 | 4 | 7 | 71 | 93 |
| 12 | 11 | 19 | 2 | 4 | 62 | 83 |
| 13 | 6 | 10 | 9 | 16 | 0 | 0 |
| 14 | 11 | 19 | 2 | 4 | 63 | 83 |
| 15 | 11[2] | 19 | 2 | 4 | 60 | 80 |
| 16 | 9 | 16 | 2 | 4 | 11 | 15 |
| 17 | 9 | 16 | 4 | 7 | 2 | 2 |
| 18 | 6 | 10 | 16 | 28 | 0 | 0 |
| 19 | 11 | 19 | 2 | 4 | 65 | 85 |
| 20 | 11[2] | 19 | 2 | 4 | 65 | 85 |
| Comp. 21 | <1 | <1 | 10 | 17 | 0 | 0 |
| Comp. 22 | <1 | <1 | 17 | 29 | —[3] | —[3] |
| Comp. 23 | 5 | 9 | 15 | 26 | 0 | 0 |
| Comp. 24 | 6 | 10 | 3 | 5 | 0 | 0 |
| Comp. 25 | 7 | 12 | 9 | 16 | 1 | 1 |
| Comp. 26 | 12 | 21 | 1 | 2 | 0 | 0 |
| Comp. 27 | 15[1] | 26 | 4 | 7 | 2 | 3 |

[1]adherend tore
[2]1 inch (2.5 cm) wide adherend
[3]not determined quantitatively, but no insolubles observed (i.e., everything dissolved)

Each bond strength value in Table V is the average reading in pounds per inch width (piw) or Newtons per cm (N/cm) over the length of the bond which was pulled. In general, preferred bond strengths are at least 5 piw (9 N/cm). The data in Table V indicate good bond formation on PTFE with most formulations. With proper formulation, good bonds were obtained on PE also.

The data of Table V also demonstrate the surprising result that solvent resistance is greatly improved when the decomplexers of the present invention are used. All of the examples of the present invention (except for examples 13, 16, 17, and 18) exhibited a % solids content after extraction of greater than 60%. When this number is corrected for only that portion of the adhesive that is capable of addition polymerization (i.e., the free-radically polymerizable vinyl compounds plus the polyamine portion of the organoborane polyamine complex if its reaction product with the decomplexer creates a new free-radically polymerizable vinyl compound through covalent or ionic bonding), the % solids increased to about 80% or more as indicated by the % Gel column in Table V. In contrast, the examples comprising the comparative decomplexers of Table II were all nearly completely soluble in the THF solvent, showing poor solvent resistance.

The poor solvent resistance which was observed for examples 13, 16, 17 and 18 may have resulted from an excessive supply of oxygen during cure, a condition which can exist when curing 2–3 grams of material in a 20 cm$^3$ vial. In order to compare the solvent resistance of adhesives cured in the bulk versus adhesives cured as sandwiched thin films, selected adhesives were tested for solvent resistance after completion of the bond strength test. This was done by peeling the thin films of cured adhesive from the adherends after the bond strength peel tests were completed. The adhesive films were weighed and placed in a 4 ounce (118 cm$^3$) glass jar. Sufficient tetrahydrofuran (THF) was added to the glass jar so that the contents comprised 5 parts by weight cured adhesive film and 95 parts by weight THF. The jar was capped and placed on a roll mixer for at least 24 hours. The solvent resistance of the thin films was then determined using the procedure described earlier for determining the solvent resistance for the bulk cured adhesives. Results are reported in Table VI below.

TABLE VI

Comparison of % Insolubles from Bulk vs Free Film

| | Bulk | | Free Film | |
|---|---|---|---|---|
| Example | % Solids | % Gel | % Solids | % Gel |
| 12 | 62 | 83 | 77 | 102 |
| 13 | 0 | 0 | 58 | 77 |
| 16 | 11 | 15 | 69 | 90 |
| 17 | 2 | 2 | 63 | 84 |
| Comp. 24 | 0 | 0 | 8 | 12 |
| Comp. 26 | 0 | 0 | 0 | 0 |

Adhesive compositions comprising the decomplexers of the present invention showed an increase in solvent resistance when cured as free films compared to bulk cure. This supports the theory that the poor solvent resistance observed for some examples of the invention may have been due to an excessive supply of oxygen during bulk cure. Free films from adhesives prepared with the comparative decomplexers of Table II, however, did not exhibit improved solvent resistance.

It is noted that preferred % Gel values for adhesives cured as sandwiched thin films exceed 15, more preferably exceed 30, most preferably exceed 50.

Various modifications and alterations of this invention will become apparent to those skilled in the art without departing from the scope and spirit of the invention. It should be understood that this invention is not limited to the illustrative embodiments set forth herein.

The embodiments for which an exclusive property or privilege is claimed are defined as follows:

1. A polymerizable acrylic composition comprising:
   a) at least one acrylic monomer;
   b) an effective amount of an organoborane amine complex; and
   c) an effective amount of a bireactive decomplexer containing isocyanate functionality, said decomplexer being reactive with said amine to liberate the organoborane to initiate polymerization of the at least one acrylic monomer.

2. A polymerizable acrylic composition according to claim 1 wherein the at least one acrylic monomer is selected from the group consisting of monofunctional acrylate ester, monofunctional methacrylate ester, substituted derivatives of the foregoing, and blends of the foregoing.

3. A polymerizable acrylic composition according to claim 1 wherein said bireactive decomplexer comprises at least one free radically polymerizable group and at least one isocyanate group in the same molecule.

4. A polymerizable acrylic composition according to claim 1 wherein said bireactive decomplexer comprises at least one alkene group and at least one isocyanate group in the same molecule.

5. A polymerizable acrylic composition according to claim 1 wherein said bireactive decomplexer comprises at least one acrylic group and at least one isocyanate group in the same molecule.

6. A polymerizable acrylic composition according to claim 1 wherein said decomplexer comprises the reaction product of a polyisocyanate and a hydroxyl compound containing a group capable of forming a covalent bond with an acrylic monomer.

7. A polymerizable acrylic composition according to claim 6 wherein said hydroxyl compound has the structure:

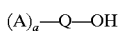

wherein "A" is a group capable of forming a covalent bond with an acrylic monomer; "a" is an integer having a value of at least one; and Q is selected from the group consisting of alkyl, aryl, cycloalkyl, alkylene ether and carbonyl groups, and combinations thereof.

8. A polymerizable acrylic composition according to claim 6 wherein said hydroxyl compound has the structure:

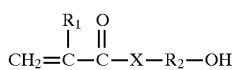

wherein $R_1$ is selected from the group consisting of hydrogen, methyl, ethyl and chlorine; $R_2$ is an alkyl group; and X is selected from the group consisting of oxygen and $NR_3$, wherein $R_3$ is selected from the group consisting of hydrogen and alkyl groups.

9. A polymerizable acrylic composition according to claim 8 wherein $R_1$ is selected from the group consisting of hydrogen and methyl; $R_2$ is an alkyl group having 2 to 16 carbon atoms; and X is oxygen.

10. A polymerizable acrylic composition according to claim 6 wherein said hydroxyl compound has the structure:

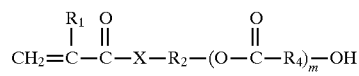

wherein $R^1$ is selected from the group consisting of hydrogen, methyl, ethyl and chlorine; $R_2$ is an alkyl group; X is selected from the group consisting of oxygen and $NR_3$, wherein $R_3$ is selected from the group consisting of hydrogen and alkyl groups; $R_4$ is an alkyl group; and m is an integer greater than or equal to 1.

11. A polymerizable acrylic composition according to claim 10 wherein $R_1$ is selected from the group consisting of hydrogen and methyl; $R_2$ is an alkyl group having 2 to 16 carbon atoms; X is oxygen; and $R_4$ is an alkyl group having 2 to 11 carbon atoms.

12. A polymerizable acrylic composition according to claim 6 wherein said hydroxyl compound is selected from the group consisting of hydroxyethylmethacrylate, hydroxyethylacrylate, and hydroxybutylacrylate; and said polyisocyanate is selected from the group consisting of isophorone diisocyanate and toluene diisocyanate.

13. A polymerizable acrylic composition according to claim 1 wherein said organoborane amine complex has the structure:

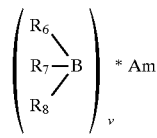

wherein $R_6$ is an alkyl group having 1 to 10 carbon atoms; $R_7$ and $R_8$ are independently selected from the group consisting of alkyl groups having 1 to 10 carbon atoms and phenyl-containing groups; the value of v is selected so as to provide a 0.5:1 to 4:1 ratio of primary or secondary amine nitrogen atoms to boron atoms in the complex; and Am is an amine.

14. A polymerizable acrylic composition according to claim 13 wherein Am has the structure:

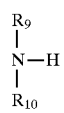

where $R_9$ and $R_{10}$ are independently selected from the group consisting of hydrogen, alkyl groups having 1 to 10 carbon atoms, ethanol and

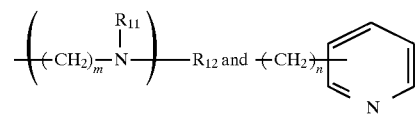

wherein $R_{11}$ and $R_{12}$ are independently selected from the group consisting of hydrogen and alkyl groups having 1 to 10 carbon atoms; m is an integer from 2 to 10; and n is an integer from 1 to 6.

15. A polymerizable acrylic composition according to claim 13 wherein Am is a polyoxyalkylenepolyamine having a structure selected from the group consisting of:

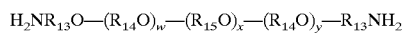

and

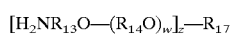

wherein $R_{13}$, $R_{14}$ and $R_{15}$ are independently selected from the group consisting of alkylene and alkyl groups; $R_{17}$ is a polyol residue; the value of w is $\geq 1$; the value of x and y are $\geq 0$; and the value of z is >2.

16. A polymerizable acrylic composition according to claim 13 wherein Am has the structure E—(L—E)$_q$—L—E wherein each E group is independently the residue of a diprimary amine-terminated material; each L is independently the residue of a material having at least two groups reactive with primary amine; and q is $\geq 0$.

17. A method of initiating the polymerization of at least one acrylic monomer, the method comprising the steps of:
   a) providing at least one acrylic monomer;
   b) blending the at least one acrylic monomer with the components of a polymerization initiator system, said system comprising:
      i) an organoborane amine complex;
      ii) an effective amount of a decomplexer comprising at least one acrylic group and at least one isocyanate group, said decomplexer being reactive with amine for liberating the organoborane to initiate polymerization of the at least one acrylic monomer; and
   c) initiating polymerization of the at least one acrylic monomer.

18. A method of increasing the solvent resistance of a polymerized acrylic adhesive composition obtained by organoborane-initiated polymerization of acrylic monomer, said method comprising the steps of:
   a) providing at least one acrylic monomer;
   b) providing a bireactive decomplexer;
   c) blending the bireactive decomplexer with the at least one acrylic monomer;
   d) providing and blending an organoborane polyamine complex to the blend formed in step c) whereby the polyamine portion of the complex reacts with and covalently bonds to the bireactive decomplexer, thereby liberating the organoborane portion of the complex; and
   e) initiating polymerization of the at least one acrylic monomer with the liberated organoborane portion of the complex and continuing polymerization until a solvent resistant acrylic adhesive composition is obtained.

19. A polymerizable acrylic adhesive composition according to claim 1.

20. A polymerizable acrylic adhesive composition according to claim 19 wherein the at least one acrylic monomer is selected from the group consisting of monofunctional acrylate ester, monofunctional methacrylate ester, substituted derivatives of the foregoing, and blends of the foregoing.

21. A polymerizable acrylic adhesive composition according to claim 19 having about 0.03 to 1.5 weight % boron.

22. A polymerizable acrylic composition comprising:
   a) at least one acrylic monomer;
   b) an effective amount of an organoborane amine complex; and
   c) an effective amount of a decomplexer that is reactive with amine to liberate the organoborane from the complex;
   wherein the decomplexer is selected such that the resulting polymerized material is essentially free from amine-decomplexer reaction product that has not been polymerized therein.

23. A polymerizable composition according to claim 22 wherein said decomplexer is a bireactive decomplexer.

24. A polymerizable composition according to claim 22 wherein said decomplexer comprises at least one free radically polymerizable group and at least one amine-reactive group in the same molecule.

25. A polymerizable composition according to claim 23 wherein said decomplexer contains isocyanate functionality.

26. A polymerizable composition according to claim 25 wherein said decomplexer comprises at least one acrylic group and at least one isocyanate group in the same molecule.

27. A polymerizable composition according to claim 23 wherein said decomplexer comprises the reaction product of a polyisocyanate and a hydroxyl compound containing a group capable of forming a covalent bond with an acrylic monomer.

28. A polymerizable composition according to claim 27 wherein said hydroxyl compound is selected from the group consisting of hydroxyethylmethacrylate, hydroxyethylacrylate, and hydroxybutylacrylate; and said polyisocyanate is selected from the group consisting of isophorone diisocyanate and toluene diisocyanate.

29. A polymerizable acrylic composition according to claim 22 wherein said organoborane amine complex has the structure:

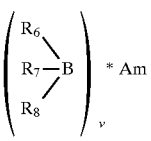

wherein $R_6$ is an alkyl group having 1 to 10 carbon atoms; $R_7$ and $R_8$ are independently selected from the group consisting of alkyl groups having 1 to 10 carbon atoms and phenyl-containing groups; the value of v is selected so as to provide a 0.5:1 to 4:1 ratio of primary or secondary amine nitrogen atoms to boron atoms in the complex; and Am is an amine.

30. A polymerizable acrylic composition according to claim 29 wherein Am has the structure:

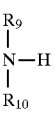

where $R_9$ and $R_{10}$ are independently selected from the group consisting of hydrogen, alkyl groups having 1 to 10 carbon atoms, ethanol and

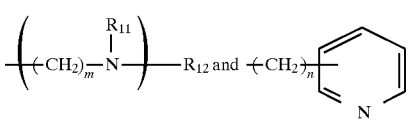

wherein $R_{11}$ and $R_{12}$ are independently selected from the group consisting of hydrogen and alkyl groups having 1 to 10 carbon atoms; m is an integer from 2 to 10; and n is an integer from 1 to 6.

31. A polymerizable acrylic composition according to claim 29 wherein Am is a polyoxyalkylenepolyamine having a structure selected from the group consisting of:

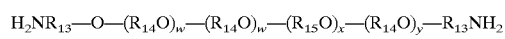

and

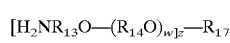

wherein $R_{13}$, $R_{14}$ and $R_{15}$ are independently selected from the group consisting of alkylene and alkyl groups; $R_{17}$ is a polyol residue; the value of w is $\geq 1$; the value of x and y are $\geq 0$; and the value of z is >2.

32. A polymerizable acrylic composition according to claim 29 wherein Am has the structure E—(L—E)$_q$L—E wherein each E group is independently the residue of a diprimary amine-terminated material; each L is independently the residues of a material having at least two groups reactive with primary amine, and q is $\geq 0$.

33. A polymerizable acrylic adhesive composition according to claim 22.

34. A polymerizable acrylic adhesive composition according to claim 33 wherein the at least one acrylic monomer is selected from the group consisting of monofunctional acrylate ester, monofunctional methacrylate ester, substituted derivatives of the foregoing, and blends of the foregoing.

35. A polymerizable acrylic adhesive composition according to claim 33 having about 0.03 to 1.5 weight % boron.

36. A two-part curable acrylic adhesive composition comprising:
(a) a first part comprising at least one acrylic monomer and a bireactive decomplexer having isocyanate functionality; and
(b) a second part comprising an organoborane amine complex.

37. A two part curable acrylic adhesive composition according to claim 36 wherein said bireactive decomplexer comprises at least one free radically polymerizable group and at least one isocyanate group in the same molecule.

38. A two part curable acrylic adhesive composition according to claim 37 wherein said decomplexer comprises the reaction product of a polyisocyanate and a hydroxyl compound containing a group capable of forming a covalent bond with an acrylic monomer.

39. A two part curable acrylic adhesive composition according to claim 37 wherein said bireactive decomplexer comprises at least one acrylic group and at least one isocyanate group in the same molecule.

40. A two part curable acrylic adhesive composition according to claim 37 wherein said at least one acrylic monomer comprises a blend of an alkyl acrylate monomer and an alkyl methacrylate monomer.

41. A two part curable acrylic adhesive composition according to claim 39 wherein said organoborane amine complex has the structure:

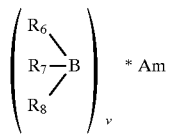

wherein $R_6$ is an alkyl group having 1 to 10 carbon atoms; $R_7$ and $R_8$ are independently selected from the group consisting of alkyl groups having 1 to 10 carbon atoms and phenyl-containing groups; the value of v is selected so as to provide an effective ratio of primary or secondary amine nitrogen atoms to boron atoms in the complex; and Am is an amine.

42. A two part curable acrylic adhesive composition according to claim 41 wherein Am has the structure:

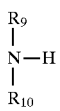

where $R_9$ and $R_{10}$ are independently selected from the group consisting of hydrogen, alkyl groups having 1 to 10 carbon atoms, ethanol and

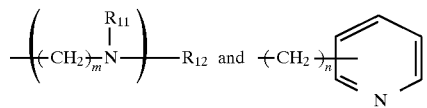

wherein $R_{11}$ and $R_{12}$ are independently selected from the group consisting of hydrogen and alkyl groups having 1 to 10 carbon atoms; m is an integer from 2 to 10; and n is an integer from 1 to 6.

43. A two part curable acrylic adhesive composition according to claim 41 wherein Am is a polyoxyalkylenepolyamine having a structure selected from the group consisting of:

and

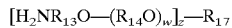

wherein $R_{13}$, $R_{14}$ and $R_{15}$ are independently selected from the group consisting of alkylene and alkyl groups; $R_{17}$ is a polyol residue; the value of w is $\geq 1$; the value of x and y are >0; and the value of z is >2.

44. A two part curable acrylic adhesive composition according to claim 41 wherein Am has the structure E—(L—E)$_q$—L—E wherein each E group is independently the residue of a diprimary amine-terminated material; each L is independently selected the residue of a material having at least two groups reactive with primary amine; and q is $\geq 0$.

45. A two part curable acrylic adhesive composition according to claim 41 having about 0.03 to 1.5 weight % boron.

46. A two part curable acrylic adhesive composition according to claim 45 further comprising an elastomeric material.

47. A polymerized acrylic adhesive composition according to claim 46.

48. A bonded composite comprising a first substrate, a second substrate, and a polymerized acrylic adhesive composition according to claim 47 that adhesively bonds the first and second substrates together.

49. A bonded composite according to claim 48 wherein at least one of said substrates has a low energy surface.

50. A polymerized acrylic adhesive composition according to claim 1.

51. A bonded composite comprising a first substrate, a second substrate and a polymerized acrylic adhesive composition according to claim 50 that adhesively bonds the first and second substrates together.

52. A bonded composite according to claim 51 wherein at least one of said substrates has a low energy surface.

* * * * *

UNITED STATES PATENT AND TRADEMARK OFFICE
CERTIFICATE OF CORRECTION

PATENT NO. : 5,872,197
DATED : February 16, 1999
INVENTOR(S) : E. John Deviny

It is certified that error appears in the above-identified patent and that said Letters Patent is hereby corrected as shown below:

Column 14,
Lines 17-19,
"Decomplexer Synthesis
Preparation of Aliphatic Isocyanto (Meth)acrylates Dibu-
tyltindilaurate (DBTDL) catalyst and 2,6-di-t-butyl-4-"
should read:
-- Decomplexer Synthesis
Preparation of Aliphatic Isocyanto (Meth)acrylates
Dibutyltindilaurate (DBTDL) catalyst and 2,6-di-t-butyl-4- --.

Column 22,
Line 64, "$H_2NR_{13}\text{-}O\text{-}(R_{14}O)_w\text{-}(R_{14}O)_w\text{-}(R_{15}O)_x\text{-}(R_{14}O)_y\text{-}R_{13}NH_2$" should read
-- $H_2NR_{13}O\text{-}(R_{14}O)_w\text{-}(R_{15}O)_x\text{-}(R_{14}O)_y\text{-}R_{13}NH_2$ --.

Column 23,
Line 6, "$E\text{-}(L\text{-}E)_qL\text{-}E$" should read -- $E\text{-}(L\text{-}E)_q\text{-}L\text{-}E$ --.
Line 46, "39" should read -- 37 --.

Column 24,
Line 25, "$H_2NR_{\text{O-}(R14}O)_w\text{-}(R_{15}O)_x\text{-}(R_{14}O)_y\text{-}R_{13}NH_2$" should read
-- $H_2NR_{13}O\text{-}(R_{14}O)_w\text{-}(R_{15}O)_x\text{-}(R_{14}O)_y\text{-}R_{13}NH_2$ --.

Signed and Sealed this

Eighteenth Day of December, 2001

*Attest:*

*Attesting Officer*

JAMES E. ROGAN
*Director of the United States Patent and Trademark Office*